United States Patent
Oikawa

(10) Patent No.: US 10,688,966 B2
(45) Date of Patent: Jun. 23, 2020

(54) PHOTOGRAPHING APPARATUS FOR VEHICLE AND HEATING DEVICE

(71) Applicant: TOYOTA JIDOSHA KABUSHIKI KAISHA, Toyota-shi, Aichi-ken (JP)

(72) Inventor: Yoshitaka Oikawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/177,586

(22) Filed: Nov. 1, 2018

(65) Prior Publication Data

US 2019/0193683 A1    Jun. 27, 2019

(30) Foreign Application Priority Data

Dec. 27, 2017   (JP) ................. 2017-250537

(51) Int. Cl.
| | |
|---|---|
| *B60S 1/02* | (2006.01) |
| *H05B 1/02* | (2006.01) |
| *H05B 3/86* | (2006.01) |
| *B60R 11/04* | (2006.01) |
| *B60R 11/00* | (2006.01) |

(52) U.S. Cl.
CPC ............ *B60S 1/026* (2013.01); *H05B 1/0236* (2013.01); *H05B 3/86* (2013.01); *B60R 11/04* (2013.01); *B60R 2011/0026* (2013.01)

(58) Field of Classification Search
USPC ........................................................... 701/36
See application file for complete search history.

(56) References Cited

U.S. PATENT DOCUMENTS

| | | | | |
|---|---|---|---|---|
| 4,478,274 A | * | 10/1984 | Naganoma ......... | B60H 1/00971 165/202 |
| 4,757,944 A | * | 7/1988 | Kagohata ............... | G05D 23/20 236/91 F |
| 5,344,070 A | * | 9/1994 | Akasaka ............ | B60H 1/00821 236/49.3 |
| 5,872,721 A | * | 2/1999 | Huston .................. | A23B 7/148 62/150 |
| 8,892,300 B2 | * | 11/2014 | Kusumi ............. | B60H 1/00385 700/276 |

(Continued)

FOREIGN PATENT DOCUMENTS

| | | |
|---|---|---|
| JP | 2017-185896 A | 10/2017 |
| JP | 2017-206098 A | 11/2017 |

*Primary Examiner* — Jean Paul Cass
(74) *Attorney, Agent, or Firm* — Sughrue Mion, PLLC

(57) ABSTRACT

A photographing apparatus for vehicle includes a control device which is configured to execute either a first processing or a second processing when a specific condition is satisfied until when a predetermined period of time elapses from start time of the predetermined period of time. The specific condition is satisfied when magnitude of a heat generation amount determination factor deviates from magnitude of the heat generation amount determination factor at the start time of the predetermined period of time by a predetermined value or more. The first processing is a processing to stop applying voltage to heating means until when the predetermined period of time elapses. The second processing is a processing to change a voltage application time based on magnitude of the heat generation amount determination factor at the time when the specific condition is satisfied.

6 Claims, 11 Drawing Sheets

(56) References Cited

U.S. PATENT DOCUMENTS

| | | | |
|---|---|---|---|
| 2007/0056947 A1* | 3/2007 | Damian | B60H 1/00785 |
| | | | 219/203 |
| 2008/0147270 A1* | 6/2008 | Sakane | B60H 1/00792 |
| | | | 701/36 |
| 2012/0047929 A1* | 3/2012 | Delorme | B60S 1/026 |
| | | | 62/155 |
| 2014/0039755 A1* | 2/2014 | Yopp | G01S 15/931 |
| | | | 701/36 |
| 2014/0148992 A1* | 5/2014 | Shaffer | G01S 15/931 |
| | | | 701/33.7 |
| 2017/0295610 A1 | 10/2017 | Usami et al. | |
| 2017/0334364 A1 | 11/2017 | Usami et al. | |
| 2019/0193647 A1* | 6/2019 | Oikawa | G03B 17/55 |
| 2019/0193683 A1* | 6/2019 | Oikawa | B60S 1/026 |

* cited by examiner

PHOTOGRAPHING APPARATUS FOR VEHICLE AND HEATING DEVICE

BACKGROUND OF THE INVENTION

1. Field of the Invention

The present invention relates to a photographing apparatus for vehicle and a heating device which are, for example, provided behind a front window of a vehicle.

2. Description of the Related Art

A camera may be provided behind a front window of a vehicle. The camera converts reflected light (object image) reflected by an object (for example, a vehicle) positioned in front of the vehicle into imaging data (electric signal) by an image pickup device, and transmits the imaging data to a control device of the vehicle.

Incidentally, at low outside air temperature (i.e., temperature outside of the vehicle), when an air heating device is used inside the vehicle, dew condensation may be generated on the front window. Further, when the outside air temperature is low, ice and/or frost may adhere to the outer surface of the front window. When such a phenomenon occurs on the front window, an imaging data produced by the image pickup device of the camera may be data indicating a blurred object image, or the image pickup device may fail to capture an object in front of the vehicle.

Thus, a heater being a heating wire and a heated portion, which the heater is fixed to and gives heat received from the heater to the front window as radiation heat, are provided behind the front window of the vehicle (i.e., provided inside the vehicle) disclosed in Japanese Unexamined Patent Application Publication No. 2017-185896.

This heater is connected to an electric power source of the vehicle via electrical supply lines. When the electric power of the electric power source is supplied to the heater, the heater generates heat. The heated portion is heated by the heat generated by the heater, and the radiation heat generated by the heated portion is given to the front window. When the temperature of the heater becomes a value within a predetermined temperature range, the temperature of the front window becomes equal to or higher than the dew point temperature. As a result, the dew condensation occurring on the front window disappears. Furthermore, ice and frost adhering to the outside surface of the front window disappear.

Therefore, when the front window is heated by the heater and the heated portion, the risk that the image pickup device captures a blurred object image or fails to capture an object image can be reduced.

SUMMARY OF THE INVENTION

The outside air temperature, vehicle speed and, etc have a correlation with the temperature of the front window which is heated by the heater. Therefore, the total heat amount to be generated by the heater for a predetermined period of time (hereinafter may be referred to as target heat generation amount) is preferably determined based on the outside air temperature, the vehicle speed and, etc. Hereinafter, a factor affecting the temperature of the window may be referred to as heat generation amount determination factor.

Therefore, "time period for applying the voltage of the electric power source to the heater in the time period from the start time of the predetermined period of time until when the predetermined period of time elapses (voltage application time)" can be adjusted based on the magnitude of the heat generation amount determination factor at the start time of the predetermined period of time.

However, the magnitude of the heat generation amount determination factor such as the outside air temperature and the vehicle speed changes with the lapse of time. Therefore, the magnitude of the heat generation amount determination factor may greatly change during time period from the start time of the predetermined period of time until when the predetermined period of time elapses. In particular, for example, when the vehicle speed becomes greatly lower compared with the start time of the predetermined period of time, there is a possibility that the temperatures of the window and the heater become excessively high when the voltage application time is continuously controlled based on the vehicle speed at the start time of the predetermined period of time.

The present invention has been made in order to cope with the above-mentioned problem. That is, the present invention has an object to provide a photographing apparatus for vehicle and a heating device which can prevent heat generation amount of heating means for a predetermined period of time from being excessive even when a heat generation amount determination factor greatly changes.

A photographing apparatus for vehicle according to the present invention comprises:

a photographing apparatus (30) that is disposed inside a vehicle so as to face a window (85) of the vehicle and is configured to receive photographing light passing through the window;

heating means (41a, 43b) that is disposed inside the vehicle so as to face the window, the heating means generating heat that is given to the window when voltage of an electric power source of the vehicle is applied to the heating means; and a control device (100) changing voltage application time that is time period for applying the voltage of the electric power source to the heating means in predetermined period of time (T) based on magnitude of a heat generation amount determination factor (Toc, SPD, Vh) affecting temperature of the window at start time of the predetermined period of time.

The control device is configured to execute either a first processing or a second processing when a specific condition is satisfied until when the predetermined period of time elapses from the start time of the predetermined period of time.

The specific condition is satisfied when the magnitude of the heat generation amount determination factor deviates from the magnitude of the heat generation amount determination factor at the start time of the predetermined period of time by a predetermined value or more.

The first processing is a processing to stop applying the voltage to the heating means until when the predetermined period of time elapses.

The second processing is a processing to change the voltage application time based on the magnitude of the heat generation amount determination factor at the time when the specific condition is satisfied.

A heating device (95) according to the present invention, which is disposed inside a vehicle so as to face a window (85) of the vehicle together with a photographing apparatus (30), the heating device comprises:

heating means (41a, 43b) that generates heat when voltage of an electric power source of the vehicle is applied to the heating means; and a control device (100) changing voltage application time that is time period for applying the voltage of the electric power source to the heating means in predetermined period of time (T) based on magnitude of a heat generation amount determination factor (Toc, SPD, Vh) affecting temperature of the window at start time of the predetermined period of time.

The control device is configured to execute either a first processing or a second processing when a specific condition is satisfied until when the predetermined period of time elapses from the start time of the predetermined period of time.

The specific condition is satisfied when the magnitude of the heat generation amount determination factor deviates from the magnitude of the heat generation amount determination factor at the start time of the predetermined period of time by a predetermined value or more.

The first processing is a processing to stop applying the voltage to the heating means until when the predetermined period of time elapses.

The second processing is a processing to change the voltage application time based on the magnitude of the heat generation amount determination factor at the time when the specific condition is satisfied.

The control device according to the present invention executes either the first processing or the second processing when the magnitude of the heat generation amount determination factor (for example, outside air temperature and vehicle speed) deviates from the magnitude of the heat generation amount determination factor at the start time of the predetermined period of time by the predetermined value or more. Therefore, for example, when the voltage is applied to the heating means over the predetermined period of time, a possibility that a heat generation amount of the heating means for the predetermined period of time becomes excessive is low.

In one of aspects of the present invention, the photographing apparatus for vehicle further comprises:

an outside air temperature detector (101) detecting an outside air temperature; and an outside air temperature corrector (100) calculating a corrected outside air temperature (Toc) by correcting the outside air temperature obtained based on a detection value of the outside air temperature detector according to a temperature increase amount that is estimated based on magnitude of an outside air temperature influence factor affecting the detection value of the outside air temperature detector.

The control device is configured to use the corrected outside air temperature as the heat generation amount determination factor.

According to this aspect, the control device changes the voltage application time based on the corrected outside air temperature obtained by correcting the outside air temperature detected by the outside air temperature detector according to the temperature increase amount which is estimated based on the magnitude of the outside air temperature influence factor. The corrected outside air temperature is likely to be close to the outside air temperature in the vicinity of the window which is heated by the heating means. Therefore, when the voltage is applied to the heating means over the predetermined period of time, there is a high possibility that the temperature of the window receiving heat from the heating means becomes a desired temperature (for example, a temperature equal to or higher than the dew point temperature).

In one of aspects of the present invention, the outside air temperature detector is provided in a front grill of the vehicle, the outside air temperature influence factor is at least one of an operation state quantity of an internal combustion engine of the vehicle, an irradiation amount of natural light given to the vehicle and an opening degree of a grill shutter (105) provided in the vehicle.

According to this aspect, since the corrected outside air temperature is calculated based on the outside air temperature influence factor affecting the detection value of the outside air temperature detector provided in the front grill, the corrected outside air temperature can be accurately obtained. Therefore, when the voltage is applied to the heating means over the predetermined period of time, the possibility that the temperature of the window receiving heat from the heating means becomes the desired temperature becomes higher.

In the above description, names and references used in the following descriptions regarding embodiments are added with parentheses to the elements of the present invention, in order to understand the invention. However, those names and references should not be used to limit the scope of the present invention. Other objects, other features, and accompanying advantages of the present invention are easily understood from the description of embodiments of the present invention to be given referring to the following drawings.

DETAILED DESCRIPTION OF THE PREFERRED EMBODIMENTS

Hereinafter, a photographing apparatus for vehicle (including a heating device) according to an embodiment of the present invention will be described with reference to the accompanying drawings.

(Configuration)

Figure 1:
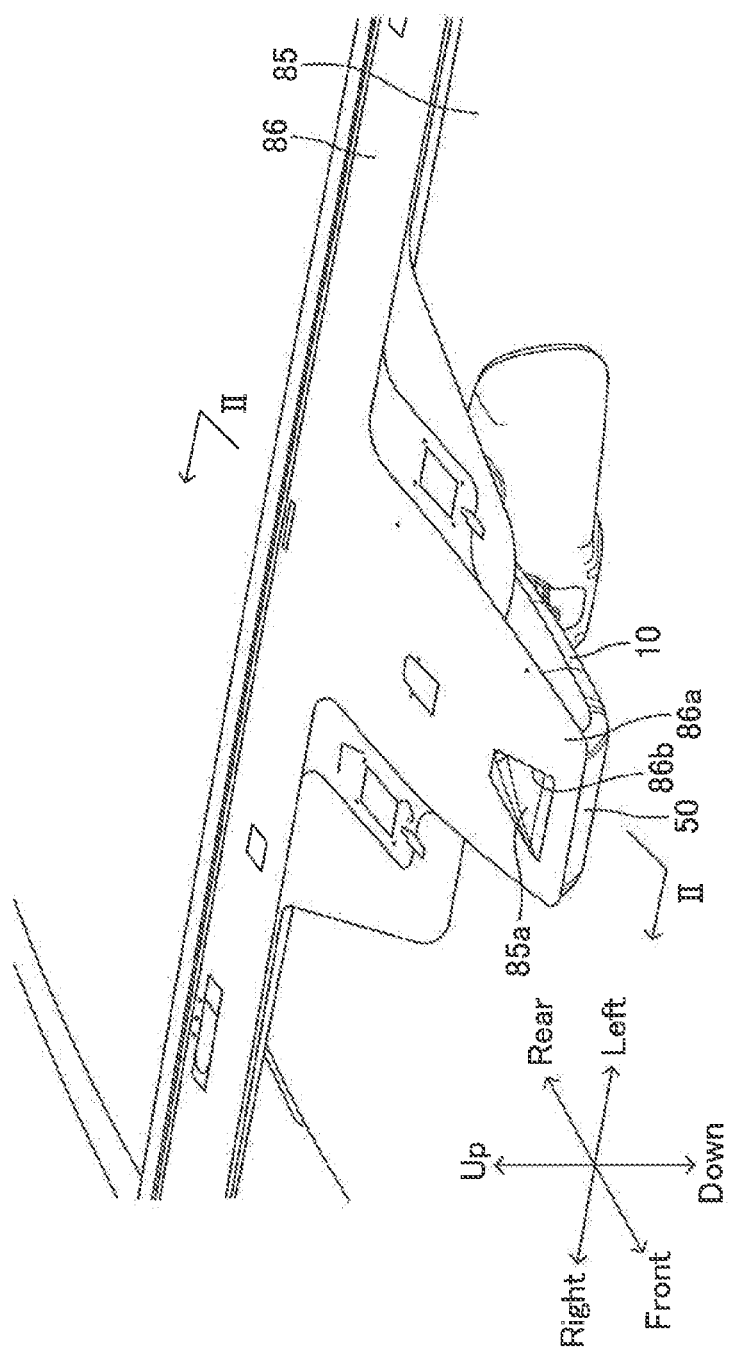
FIG. 1 is a perspective view of a photographing apparatus for vehicle and a front window according to an embodiment of the present invention as viewed from the front.
Figure 2:
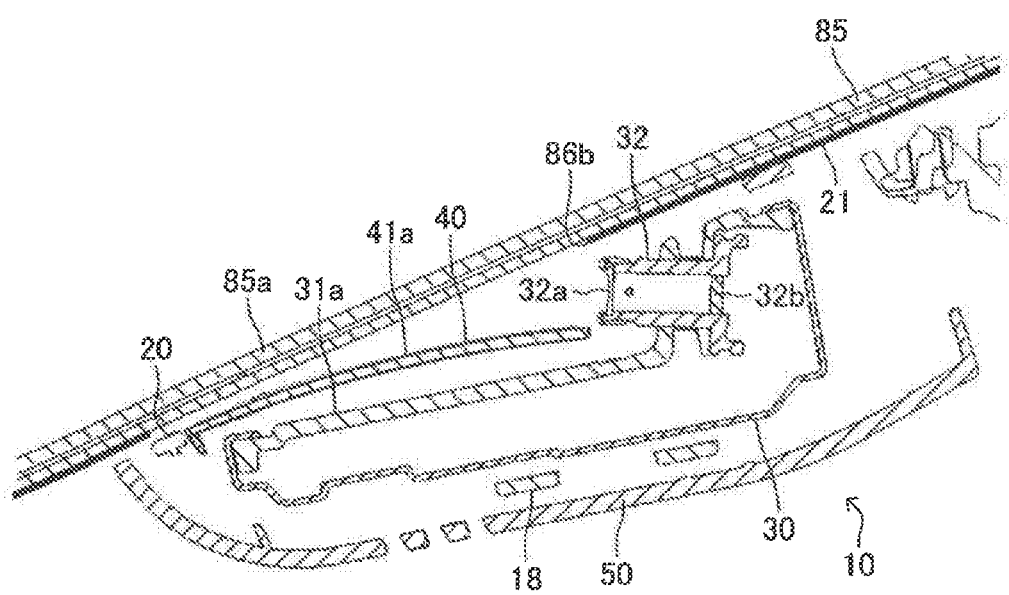
FIG. 2 is a cross-sectional view taken along line II-II in FIG. 1.

As shown in FIG. 1, a photographing apparatus for vehicle 10 (hereinafter referred to as a "photographing apparatus 10") according to the embodiment is provided behind a front window 85 of a vehicle (i.e., provided inside the vehicle). The front window 85 is made from translucent glass. The front window 85 may be made from a material (for example, resin) other than glass as long as it has translucency. As shown in FIG. 2, the front window 85 is inclined with respect to the vehicle body in such a manner that the front window 85 gradually heads toward the front of the vehicle as approaching the lower end thereof from the upper end thereof.

As shown in FIG. 1, a light shielding sheet 86 having a substantially T-shape in its entire shape is attached to an upper edge portion and its vicinity of the rear surface (that is, a surface on the vehicle interior side) of the front window 85. At the central portion of the light shielding sheet 86, a forward extending portion 86a extending forward and obliquely downward is formed. A light transmission hole 86b having a substantially trapezoidal shape is formed in the vicinity of the front end of the forward extending portion 86a. A portion of the front window 85 which faces the light transmission hole 86b is a light transmission portion 85a. The photographing apparatus 10 is provided behind the front window 85 (i.e., inside the vehicle) so as to face the light transmission portion 85a.

Figure 3:
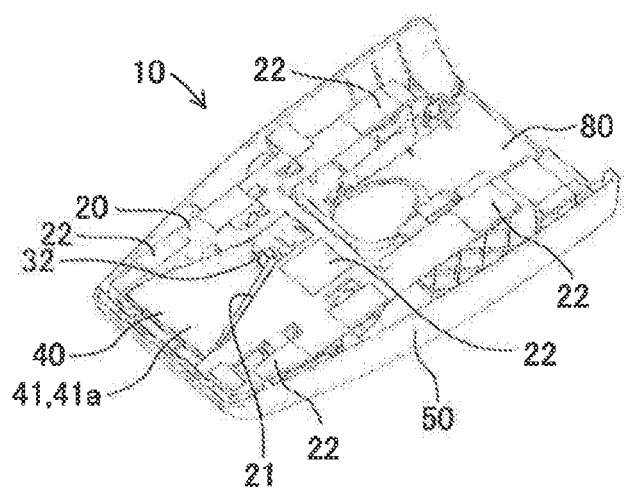
FIG. 3 is a perspective view of the photographing apparatus for vehicle as viewed from the above.
Figure 4:
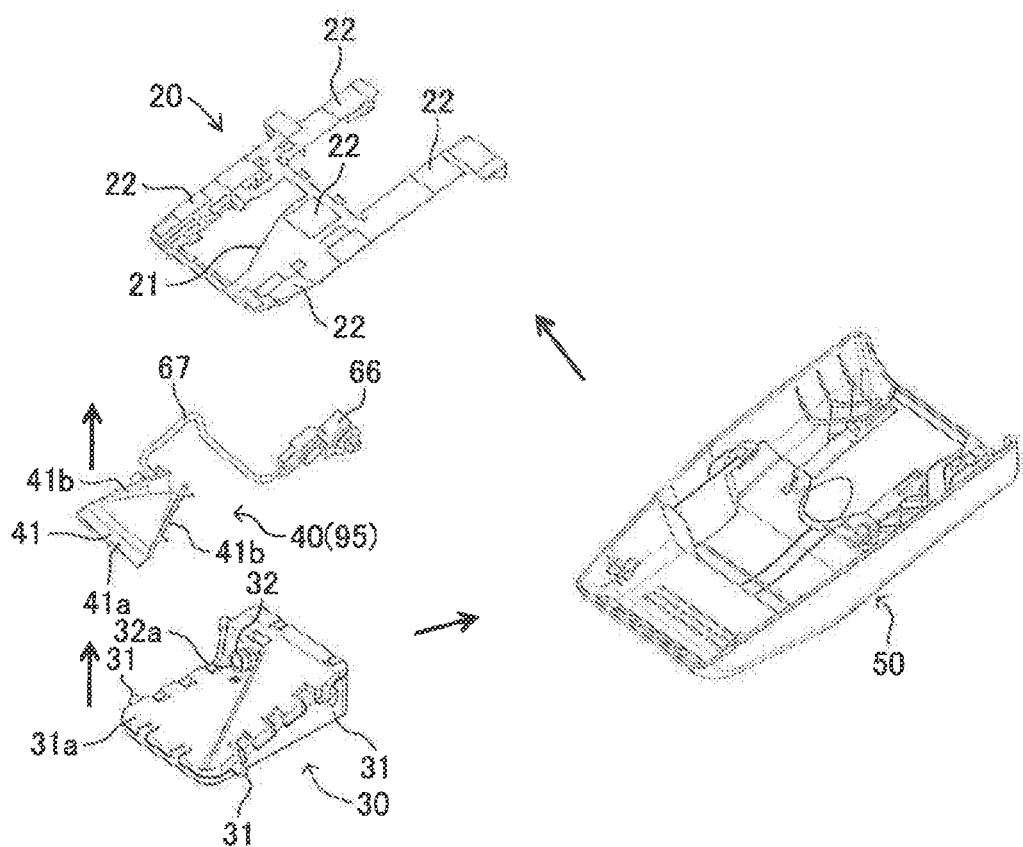
FIG. 4 is an exploded perspective view of the photographing apparatus for vehicle as viewed from the above.

As shown in FIGS. 3 and 4, the photographing apparatus 10 includes a bracket 20, a camera unit 30, a light shielding and heating unit 40, and a cover 50 as main components.

The bracket 20 is made from a hard resin. A support portion 21, which is substantially trapezoidal through hole, is formed in the bracket 20. Further, a plurality of adhesive surfaces 22 are formed on the upper surface of the bracket 20.

The camera unit 30 includes a housing 31 and an image pickup unit 32. The housing 31 is an integrally molded product made from resin and constitutes the outer shape of the camera unit 30. A hood mounting recess 31a having a substantially trapezoid shape in a plan view is formed on the upper surface of the housing 31. The image pickup unit 32 is fixed to the rear end surface of the hood mounting recess 31a. As shown in FIG. 2, the image pickup unit 32 includes a lens 32a and an image pickup device 32b positioned immediately behind the lens 32a. The image pickup device 32b is a compound eye type device. The image pickup device 32b receives reflected light (photographing light), which is reflected backward by an obstacle located in front of the camera unit 30 and passes through the lens 32a. The upper portion of the camera unit 30 is engaged with the bracket 20 and is supported by the bracket 20. Noted that, a thermistor 30a (see FIG. 9), which can detect the temperature Tc of the camera unit 30, is provided inside the camera unit 30.

The light shielding and heating unit 40 shown in FIGS. 4 to 8 (particularly, FIG. 5) is provided with a light shielding hood 41, a double-faced adhesive tape 42, a heater module 43, a fuse module 44, a heat insulator 45 and a cable module 46 as main components.

The light shielding hood 41 is an integrally molded product made from a hard resin. The light shielding hood 41 includes a heated portion 41a and side wall portions 41b. The heated portion 41a is a plate having an equilateral triangular shape (that is, the heated portion 41a has an equilateral triangular shape in the front view). The heated portion 41a is bilaterally symmetrical with respect to the center line L1 extending in the front-rear direction. The side wall portions 41b are a pair of flange portions extending upward from left and right side edge portions of the heated portion 41a, respectively. The height of each side wall portion 41b gradually increases from the front end thereof to the rear end thereof.

The heater module 43 includes a PET sheet 43a and a heater 43b.

The PET sheet 43a is made from PET (polyethylene terephthalate). The outer shape of the PET sheet 43a is substantially the same shape as that of the heated portion 41a. That is, the PET sheet 43a is an equilateral triangle bilaterally symmetrical with respect to the center line L1. The PET sheet 43a has good insulating property.

The heater 43b is a heating wire made from a metal (for example, brass) that generates heat when receiving electricity. The heater 43b is formed on substantially the entire upper surface of the PET sheet 43a by printing in a zig-zag manner. Both end portions of the heater 43b are constituted by a pair of lands 43c and 43d having larger area than the other portions of the heater 43b. The lands 43c, 43d are exposed on the upper and lower surfaces of the PET sheet 43a. The land 43c is provided in the vicinity of the rear corner of the PET sheet 43a, and the land 43d is provided in the vicinity of front right corner of the PET sheet 43a.

The lower surface of the double-faced adhesive tape 42 is attached to the upper surface of the PET sheet 43a so as to cover the heater 43b. The double-faced adhesive tape 42 has substantially the same shape as the heated portion 41a and the PET sheet 43a. The upper surface of the double-faced adhesive tape 42 is attached to the lower surface of the heated portion 41a. As a result, the heater module 43 is fixed to the light shielding hood 41. The double-faced adhesive tape 42 has good thermal conductivity. The peripheral edge portion of the PET sheet 43a overlaps the peripheral edge portions of the double-faced adhesive tape 42 and the heated portion 41a.

The fuse module 44 is integrally provided with a double-faced adhesive tape 44a, a fuse 44b and two lead wires 44c, 44d.

Figure 5:
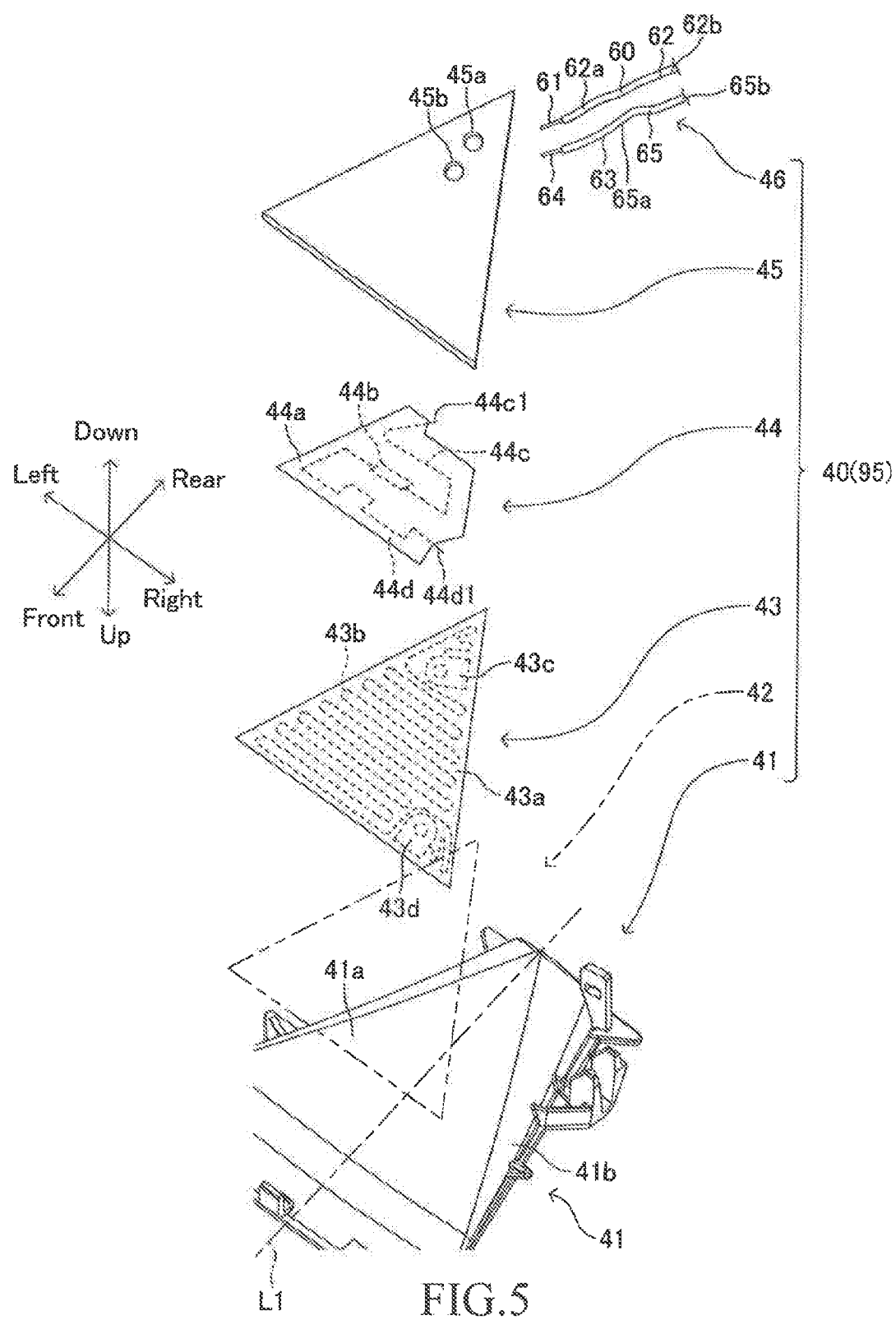
FIG. 5 is an exploded perspective view of a light shielding and heating unit as viewed from the below.

The double-faced adhesive tape 44a is a sheet-like member having a shape shown in FIG. 5, and both surfaces of the double-faced adhesive tape 44a are adhesive surfaces. The thermal conductivity of the double-faced adhesive tape 44a is lower than those of the light shielding hood 41, the double-faced adhesive tape 42, and the PET sheet 43a.

The fuse 44b is a current limiting element, and includes a cylindrical insulating case and a soluble metal which has conductivity. The soluble metal is provided inside the insulating case and is fixed to the insulating case. The insulating case of the fuse 44b is attached to the substantially central portion of the upper surface of the double-faced adhesive tape 44a.

The two lead wires 44c, 44d are attached to the upper surface of the double-faced adhesive tape 44a in the illustrated manner. One end of each of the two lead wires 44c, 44d is located in the insulating case of the fuse 44b. The one end of the lead wire 44c is connected to one end of the soluble metal, and the one end of the lead wire 44d is connected to the other end of the soluble metal. On the other hand, connecting ends 44c1, 44d1, which are the other ends of the two lead wires 44c, 44d, are both located on the outer peripheral side with respect to the double-faced adhesive tape 44a.

Figure 7:
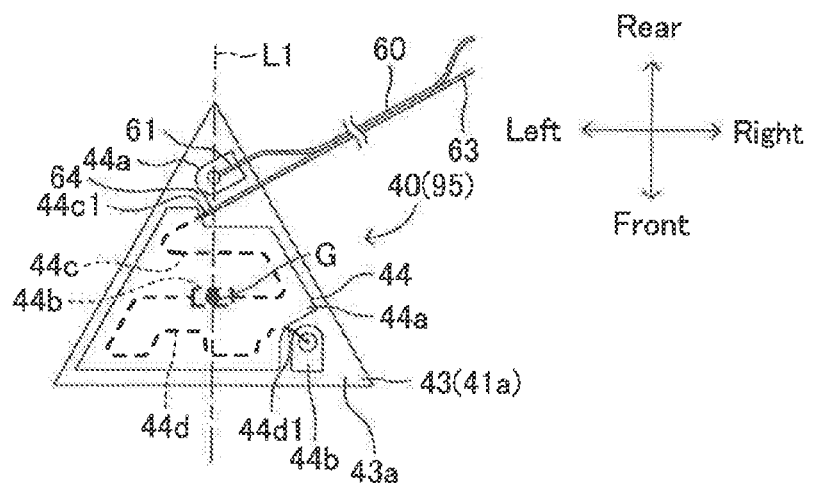
FIG. 7 is a schematic view of a heated portion, a heater module, a fuse module, and a cable module as viewed from the below.

The upper surface of the double-faced adhesive tape 44a is attached to the lower surface of the PET sheet 43a. As a result, the fuse module 44 is fixed to the heater module 43. As shown in FIG. 7, the entire fuse module 44 is located on the inner peripheral side with respect to the outer peripheral edge portion of the PET sheet 43a. The pair of the lands 43c, 43d of the heater module 43 are located on the outer peripheral side with respect to the double-faced adhesive tape 44a. Furthermore, as shown in FIG. 7, the fuse 44b of the fuse module 44 is located at a position overlapping the position of the center of gravity G of the heated portion 41a in the thickness direction of the heated portion 41a. That is, the fuse 44b is arranged on a straight line, which extends in the thickness direction of the heated portion 41a and passes through the center of gravity G.

The fuse 44b and the lead wires 44c, 44d (except for the connecting ends 44c1, 44d1) are in contact with the lower surface of the PET sheet 43a. That is, the fuse 44b and the lead wires 44c, 44d (except for the connecting ends 44c1, 44d1) and the portion of the heater 43b excluding the lands 43c, 43d are insulated from each other by the PET sheet 43a positioned therebetween. Further, the connecting end 44d1 of the lead wire 44d is soldered to the lower surface of the land 43d of the PET sheet 43a (not shown).

The heat insulator 45 is made from an insulating material, and has substantially the same shape as the heated portion 41a. That is, the heat insulator 45 is an equilateral triangular sheet-like member. A pair of through-holes 45a, 45b are formed in the vicinity of the rear end corner of the heat insulator 45. The thermal conductivity of the heat insulator 45 is lower than those of the light shielding hood 41, the double-faced adhesive tape 42, the PET sheet 43a, and the double-faced adhesive tape 44a.

The upper surface of the heat insulator 45 is attached to the lower surface of the double-faced adhesive tape 44a. A portion of the upper surface of the heat insulator 45, which does not face the double-faced adhesive tape 44a, is in contact with the lower surface of the PET sheet 43a. The peripheral portion of the heat insulator 45 is in contact with a portion of the light shielding hood 41 which is positioned on the outer peripheral side with respect to the peripheral portions of the heated portion 41a and the PET sheet 43a. In addition, the through-holes 45a, 45b of the heat insulator 45 are located on the center line L1 when viewed in the thickness direction of the heated portion 41a. When the heat insulator 45 is fixed to the double-faced adhesive tape 44a, the through-hole 45a is located immediately below the land 43c of the PET sheet 43a and the through-hole 45b is located immediately below the connecting end 44c1 of the lead wire 44c.

As shown in FIGS. 5 to 9, the cable module 46 is provided with a first electric cable 60, a second electric cable 63, a connector 66 (see FIGS. 4 and 9) connected to one end of the first electric cable 60 and one end of the second electric cable 63, and a banding tube 67.

The first electric cable 60 includes an electric wire 61 made of a metal wire having good conductivity and a covering tube 62 covering the outer peripheral surface of the electric wire 61 excluding the outer peripheral surface of both end portions thereof. Similarly, the second electric cable 63 includes an electric wire 64 made of a metal wire having good conductivity and a covering tube 65 covering the outer peripheral surface of the electric wire 64 excluding the outer peripheral surface of both end portions thereof.

Two metallic contacts (not shown) are provided inside the connector 66. One of the two contacts is an anode and the other of the two contacts is a cathode. One end of the first electric cable 60 and one end of the second electric cable 63 are connected to the connector 66. One end of the electric wire 61 is connected to one contact which is the anode and one end of the electric wire 64 is connected to the other contact which is the cathode.

Figure 6:
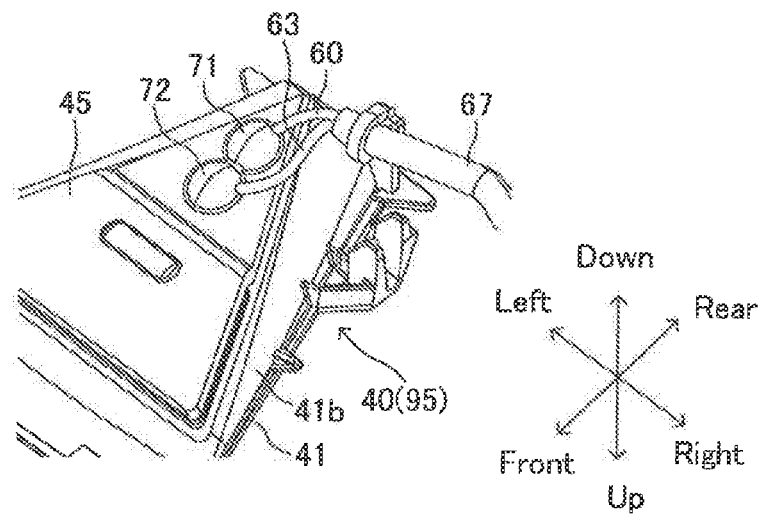
FIG. 6 is a perspective view of the light shielding and heating unit as viewed from the below.

Further, as shown in FIGS. 4 and 6, portions of the covering tube 62 and the covering tube 65, which are different from the front and rear end portions thereof, are inserted into the single banding tube 67. That is, the banding tube 67 bundles the covering tube 62 and the covering tube 65 so as not to separate from each other.

Figure 8A:
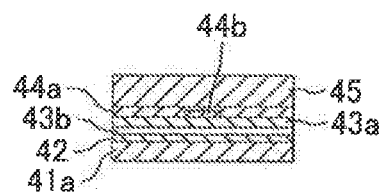
FIG. 8a is a cross-sectional view of the light shielding and heating unit when being cut at a position passing through the fuse.
Figure 8B:
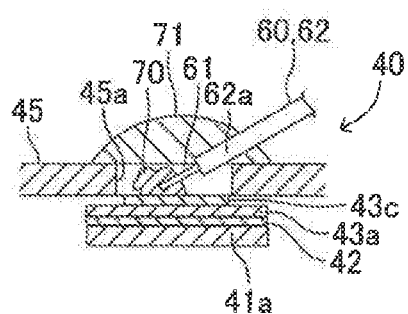
FIG. 8b is a cross-sectional view of the light shielding and heating unit when being cut at a position passing through a sealant.

As shown in FIG. 8B, the other end of the electric wire 61 of the first electric cable 60 is inserted into the through-hole 45a of the heat insulator 45, and the other end of the electric wire 61 is connected to the lower surface of the land 43c by a solder 70. Although illustration is omitted, the other end of the electric wire 64 of the second electric cable 63 is inserted into the through-hole 45b of the heat insulator 45. The other end of the electric wire 64 and the connecting end 44c1 of the lead wire 44c are soldered to each other.

As shown in FIGS. 6, 8A, and 8B, a sealant 71 having electrical insulation property is fixed to the lower surface of the heat insulator 45 and a fixed portion 62a (shown in FIGS. 5 and 8B) that is the vicinity of the through-hole 45a side end of the covering tube 62 of the first electric cable 60. The through-hole 45a is covered with this sealant 71. Similarly, as shown in FIG. 6, a sealant 72 having electrical insulation property is fixed to the lower surface of the heat insulator 45 and a fixed portion 65a (shown in FIG. 5) that is the vicinity of the through-hole 45b side end of the covering tube 65 of the second electric cable 63. The through-hole 45b is covered with this sealant 72.

As shown in FIGS. 3 and 4, the light shielding hood 41 of the light shielding and heating unit 40 is fitted into the hood mounting recess 31a of the camera unit 30, and the front portion of the image pickup unit 32 is located directly above the rear end portion of the heated portion 41a through a gap between the rear end portions of the left and right side wall portions 41b. Further, as shown in FIGS. 2 and 3, the light shielding hood 41 of the light shielding and heating unit 40 is fitted into the support portion 21 of the bracket 20, and the upper surface of the cover 50 is fixed to the bracket 20 so as to cover the camera unit 30 and the light shielding and heating unit 40.

The connector 66 of the cable module 46 is drawn backward of the cover 50 through the rear end opening of the cover 50.

As shown in FIGS. 1 and 2, the photographing apparatus 10, which is integrated in this way, is fixed to the vehicle interior side surface of the forward extending portion 86a of the light shielding sheet 86 by using adhesive (not shown) applied to each adhesive surface 22 of the bracket 20. Then, the support portion 21 of the bracket 20, the heated portion 41a of the light shielding and heating unit 40, and the image pickup unit 32 of the camera unit 30 are positioned at positions facing the light transmission hole 86b of the light shielding sheet 86. Accordingly, photographing light, which is directed from the front side of the front window 85 to the rear side of the front window 85 and passes through the light transmission portion 85a and the light transmission hole 86b of the light shielding sheet 86 backward, is received by the image pickup device 32b after passing through the lens 32a of the image pickup unit 32.

Figure 9:
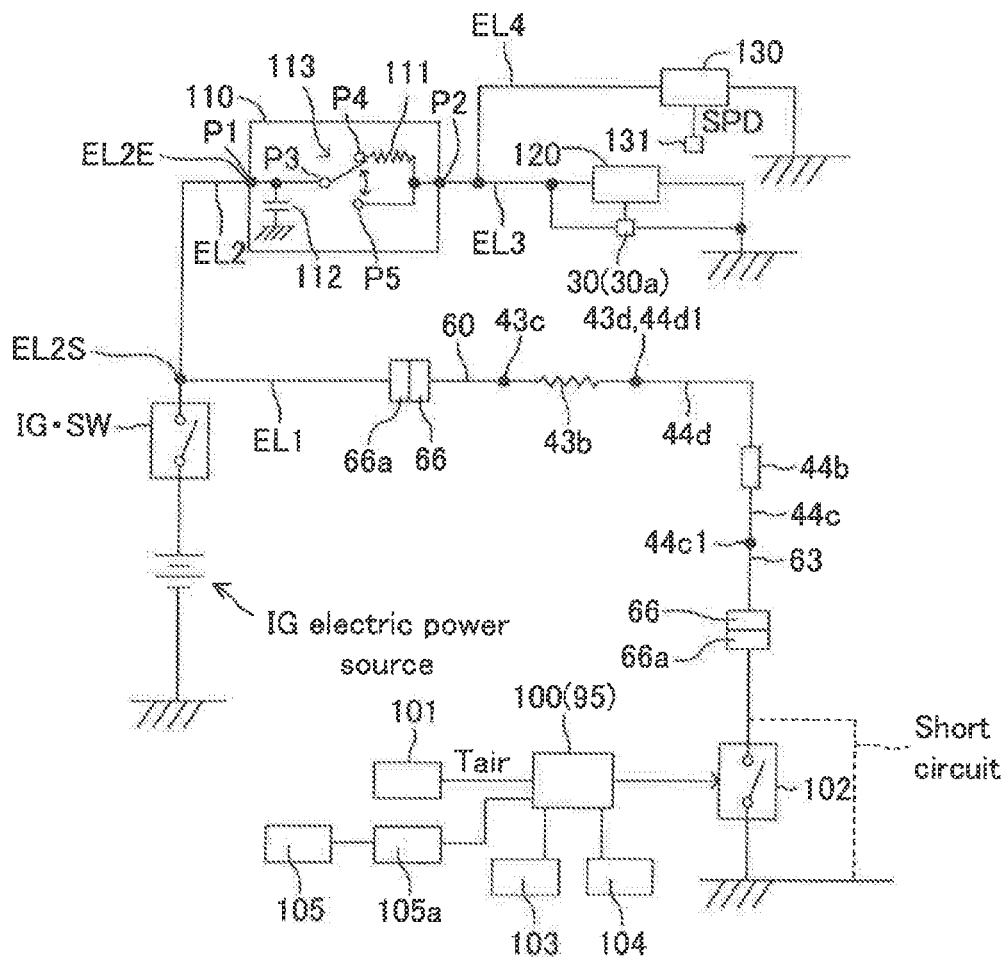
FIG. 9 is a schematic view of an electrical circuit.

As shown in FIG. 9, the vehicle is provide with an electric control device (not shown, hereinafter referred to as "control device") 100. The control device 100 is an ECU. ECU is an abbreviation of Electric Control Unit, and is provided with a microcomputer including a CPU and a storage device such as a ROM and a RAM. The CPU implements various functions by executing instructions (programs) stored in the ROM. A "low speed duty ratio calculation map (MapLo)", a "high speed duty ratio calculation map (MapHi)", and "first to third maps for correcting outside air temperature" are stored in the storage device (ROM) of the control device 100.

Further, the vehicle is provided with an outside air temperature sensor 101 for measuring a temperature Tair outside of the vehicle. The outside air temperature sensor 101 is provided in a front grill of the vehicle. The outside air temperature sensor 101 is connected to the control device 100. Further, the vehicle is provided with a vehicle speed sensor 131. The vehicle speed sensor 131 is connected to a brake control ECU 130 described later. Further, the control device 100, a camera control ECU 120 described later, and the brake control ECU 130 are capable of transmitting and receiving information (signals) to each other via a CAN (not shown).

Furthermore, the vehicle is provided with a switch element 102. The switch element 102 is a semiconductor switch element. The state of the switch element 102 is switched between an ON state (conduction state or connection state) and an OFF state (nonconduction state or disconnection state) by the control device 100. The switch element 102 may be a relay type switch.

Furthermore, an engine state quantity detection sensor 103, a solar radiation amount sensor 104 and an actuator 105a are connected to the control device 100.

The engine state quantity detection sensor 103 generates a signal corresponding to state quantities of an engine (an internal combustion engine) disposed in an engine room which is provided in the front part of the vehicle. These state quantities include, for example, a cooling water temperature THW, an engine rotation speed NE, and an engine torque Tq (actually, an accelerator pedal operation amount PA for estimating the engine torque Tq).

The solar radiation amount sensor 104 is provided in the front grill. The solar radiation amount sensor 104 generates a signal corresponding to an irradiation amount L of natural light (sunlight) received by the solar radiation amount sensor 104.

When receiving a rotation instruction signal from the control device 100, the actuator 105a changes an opening degree θ of a grill shutter 105 provided immediately behind the front grill to an opening degree corresponding to the rotation instruction signal.

As shown in FIG. 9, the connector 66 of the light shielding and heating unit 40 is connected to a vehicle body side connector 66a provided in the vehicle body. Actually, the connector 66 and the vehicle body side connector 66a are integrated members. However, in FIG. 9, the connector 66 and the vehicle body side connector 66a are drawn in a manner that the connector 66 and the vehicle body side connector 66a are divided into two pieces in order to be easy to understand the connection relation.

The first electric cable 60 is connected to an anode of a vehicle installation electric power source (i.e., an IG electric power source or battery) via the connector 66, the vehicle body side connector 66a, an electrical supply line EL1, and an ignition switch (IG-SW). A cathode of the IG electric power source is grounded. The second electric cable 63 is connected to one end of the switch element 102 via the connector 66 and the vehicle body side connector 66a. The other end of the switch element 102 is grounded.

Therefore, when the switch element 102 is in the OFF state, electricity of the IG electric power source is not supplied to the heater 43b, so that the heater 43b does not generate heat. When the switch element 102 is in the ON state, electricity of the IG electric power source is supplied to the heater 43b, so that the heater 43b generates heat.

One end EL2S of an electrical supply line EL2 is connected to the ignition switch (IG-SW). The other end EL2E of the electrical supply line EL2 is connected to an input terminal P1 of a relay element 110. An output terminal P2 of the relay element 110 is connected to one end of an electrical supply line EL3 and one end of an electrical supply line EL4.

A power supply line (not shown) of the camera control ECU 120 is connected to the other end of the electrical supply line EL3. An earth line (not shown) of the camera control ECU 120 is grounded. As a result, the camera control ECU 120 is supplied with electricity from the IG electric power source via the relay element 110. In addition, a power supply line (not shown) of the camera unit 30 is connected to the other end of the electrical supply line EL3, and an earth line (not shown) of the camera unit 30 is grounded. As a result, the camera unit 30 is supplied with electricity from the IG electric power source via the relay element 110. The camera control ECU 120 and the camera unit 30 are connected to each other so as to be capable of transmitting and receiving various signals therebetween.

A power supply line (not shown) of the brake control ECU 130 is connected to the other end of the electrical supply line EL4. An earth line (not shown) of the brake control ECU 130 is grounded. As a result, the brake control ECU 130 is supplied with electricity from the IG electric power source via the relay element 110. The brake control ECU 130 is connected to a brake device (not shown) of the vehicle, and controls a braking force of the vehicle using the brake device.

The vehicle speed sensor 131 generates a signal corresponding to the speed SPD of the vehicle. The vehicle speed sensor 131 is connected to the brake control ECU 130. The brake control ECU 130 detects (acquires) the vehicle speed SPD based on the signal received from the vehicle speed sensor 131.

A power supply line (not shown) of the control device 100 is connected to the electrical supply line EL1. However, a power supply line (not shown) of the control device 100 may be connected to the output terminal P2 of the relay element 110. An earth line (not shown) of the control device 100 is grounded. As a result, the control device 100 is supplied with electricity from the IG electric power source.

The relay element 110 includes a resistor 111, a capacitor 112, and a switching portion 113.

One end of the resistor 111 is connected to a terminal P4 of the switching portion 113. The other end of the resistor 11 is connected to the output terminal P2.

One polar plate of the capacitor 112 is connected to the input terminal P1 and the terminal P3 of the switching portion 113. The other polar plate of the capacitor 112 is grounded. Therefore, while the ignition switch (IG·SW) is closed, the capacitor 112 is charged by the IG electric power source. The terminal P3 is connected to the input terminal P1. A terminal P5 is connected to the output terminal P2.

Based on a signal from the control device 100, the switching portion 113 selectively realizes either a state (a first state) in which the terminal P3 and the terminal P4 are connected to each other or a state (a second state) in which the terminal P3 and the terminal P5 are connected to each other.

By the way, the control device 100 performs a start-and-stop control (hereinafter referred to as SS control) that automatically operates and stops the internal combustion engine (not shown) mounted on the vehicle according to the driving state of the vehicle.

The control device 100 sets the switching portion 113 to the first state (the state where the terminal P3 is connected to the terminal P4) when the internal combustion engine is operating. Therefore, in this case, electricity supplied from the IG electric power source is supplied to "the camera control ECU 120 and the camera unit 30" via the ignition switch (IG·SW), the electrical supply line EL2, the resistor 111 and the electrical supply line EL3. Similarly, electricity supplied from the IG electric power source is supplied to the brake control ECU 130 via the ignition switch (IG·SW), the electrical supply line EL2, the resistor 111 and the electrical supply line EL4.

When the operation of the internal combustion engine is stopped by the SS control, an alternator which is driven by the internal combustion engine stops generating power. Therefore, when the operation of the internal combustion engine is stopped, the voltage of the IG electric power source becomes lower than when the internal combustion engine is operating. Furthermore, when the internal combustion engine, which is in a stopped state, is restarted by the SS control, a starter motor rotates using electricity supplied from the IG electric power source. Therefore, while the internal combustion engine is restarted, the voltage of the IG electric power source is further lower than when the operation of the internal combustion engine is stopped. As described above, when the control device 100 performs the SS control, the voltage of the IG electric power source tends to be lowered, so that the operation of the camera unit 30 tends to become unstable.

Therefore, when the internal combustion engine is stopped or the operation of the internal combustion engine is automatically started by the SS control, the control device 100 sets the switching portion 113 to the second state (the state where the terminal P3 is connected to the terminal P5). Therefore, in this case, electricity stored in the capacitor 112 is supplied to "the camera control ECU 120 and the camera unit 30" via the electrical supply line EL2 and the electrical supply line EL3. Similarly, electricity stored in the capacitor 112 is supplied to the brake control ECU 130 via the electrical supply line EL2 and the electrical supply line EL4. As a result, even if the voltage of the IG power source is lowered, high voltage electricity is supplied from the capacitor 112 to the camera control ECU 120, the camera unit 30, the brake control ECU 130, etc. via the output terminal P2.

Incidentally, as will be described later, when the voltage of the electrical supply line EL1 (i.e., the voltage Vh (the heater voltage Vh) which is substantially equal to the voltage of the IG electric power source and is applied to the heater 43$b$) changes, the heat generation amount of the heater 43$b$ changes. Therefore, it is necessary to estimate the heater voltage Vh. On the other hand, in the present embodiment, it is difficult to provide a voltage measuring device in the electrical supply line EL1 due to the configuration of the electrical circuit. Therefore, it is impossible to directly measure the heater voltage Vh.

On the other hand, the camera control ECU 120 is configured to be capable of detecting a voltage Vc of electricity supplied to the camera control ECU 120 (potential of the electrical supply line EL3). Therefore, based on the voltage Vc, the camera control ECU 120 estimates the heater voltage Vh (in particular, potential of the electrical supply line EL1 when the switch element 102 is in the ON state) by calculation. Then, the control device 100 receives the estimated heater voltage Vh from the camera control ECU 120 through communication, and executes energization control of the heater 43$b$ based on the received heater voltage Vh.

The voltage measured by the camera control ECU 120 is defined as Vc, the voltage drop amount caused by the resistor 111 when the switching portion 113 connects the terminal P3 to the terminal P4 (i.e., when the switching portion 113 is in the first state) is defined as Vr, and the voltage of the IG electric power source is defined as Vp. In this case, as shown in the following equation, the voltage Vp of the electric power source is equal to the sum of the voltage Vc and the voltage drop amount Vr.

$$Vp=Vc+Vr$$

The voltage drop amount Vr is the product of the resistance value of the resistor 111 and the value of current flowing through the resistor 111. When the current value of the camera control ECU 120 (the electrical supply line EL3) and the current value of the brake control ECU 130 (the electrical supply line EL4) are added, the added value is the current value of the resistor 111. Therefore, when the current value of the electrical supply line EL3 and the current value of the electrical supply line EL4 can be detected, the voltage drop amount Vr can be calculated.

In the present embodiment, the camera control ECU 120 can detect the current value of the electricity supplied to the camera control ECU 120, however, the brake control ECU 130 cannot measure the current value of the electricity supplied to the brake control ECU 130. However, the electrical circuit of the present embodiment is designed so that the sum of the current value of the electrical supply line EL3 and the current value of the electrical supply line EL4 (i.e., the current value of the resistor 111) dose not exceed a predetermined maximum current value Imax regardless of the magnitude of the voltage of the IG electric power source. In other words, the camera control ECU 120, the camera unit 30, and the brake control ECU 130 are designed so that value of current flowing through the camera control ECU 120, value of current flowing through the camera unit 30, and value of current flowing through the brake control ECU 130 do not exceed their respective maximum current values. The sum of these maximum current values does not exceed the maximum current value Imax.

Therefore, the maximum current value Imax is stored in the ROM of the camera control ECU 120. Then, the camera control ECU 120 calculates the maximum value Vrmax of the voltage drop amount Vr as the product of the resistance value of the resistor 111 and the maximum current value Imax (i.e., the resistance value of the resistor 111 times (×) the maximum current value Imax), and calculates the voltage Vp of the IG electric power source (=the voltage Vc+the maximum value Vrmax) by adding the maximum value Vrmax and the voltage Vc.

Since the maximum current value Imax of this embodiment is 0.5 A (ampere) and the resistance value of the resistor 111 is 1.0Ω, the camera control ECU 120 calculates the voltage Vp as a value higher than the voltage Vc by 0.5 V (=the maximum value Vrmax). However, since the actual current value of the resistor 111 is equal to or less than the maximum current value Imax, the actual voltage of the IG electric power source (i.e., the actual value of the heater voltage Vh) can be lower than the estimated voltage Vp (=the voltage Vc+the maximum value Vrmax) by 0.5 V at the maximum. In other words, there may be a difference between the actual heater voltage Vh and the estimated voltage Vp. However, since the maximum current value Imax is a small value (0.5 A), this difference is a small value.

Furthermore, when the switching portion 113 connects the terminal P3 to the terminal P5 (i.e., when the switching portion 113 is in the second state), the camera control ECU 120 regards the voltage Vc measured by the camera control ECU 120 as the voltage Vp (=Vh). However, in this case, as will be understood from the explanation on the SS control described above, the actual voltage of the IG electric power source (i.e., the heater voltage Vh) is likely to be lower than the voltage Vc. That is, regardless of whether the switching portion 113 is in the first state or in the second state, the estimated voltage Vp becomes a value higher than the actual heater voltage.

The light shielding and heating unit 40 and the control device 100 described above are components of the heating device 95.

(Operation)

Next, the operations of the vehicle and the photographing apparatus 10 will be described. When an ignition key (not shown) is operated, the ignition switch (IG·SW) is closed and thus the anode of the IG electric power source is made to be connected to the electrical supply line EL1, the electrical supply line EL2, and the control device 100. As a result, the camera control ECU 120 causes the camera unit 30 to start imaging. The camera unit 30 acquires imaging data using the image pickup unit 32 each time a predetermined period of time elapses.

More specifically, the image pickup device 32b of the image pickup unit 32 captures reflected light, which is reflected backward by an object (for example, another vehicle) positioned in front of the vehicle having the photographing apparatus 10 and passes through the light transmission portion 85a of the front window 85, the light transmission hole 86b of the light shielding sheet 86, and the lens 32a, to generate imaging data. The camera unit 30 transmits the imaging data to the camera control ECU 120. The camera control ECU 120 processes the imaging data received from the camera unit 30, and transmits it to the control device 100 each time a predetermined period of time elapses. By analyzing the received imaging data, the control device 100 acquires information (forward information) on an object (other vehicle, obstacle, etc.) existing in front of the vehicle, and controls the vehicle based on the forward information.

For example, based on the forward information, the control device 100 executes "automatic brake control, lane keeping assist control (i.e., lane tracing assist control), adaptive high beam control" and the like, executes automatic operation, and issues an alarm. Hereinafter, such a control based on forward information is referred to as driving support control.

Furthermore, when the ignition switch is closed, the control device 100 executes the detection operation described below every time a sampling period elapses.

The control device 100 acquires the outside air temperature Tair based on a signal from the outside air temperature sensor 101.

The control device 100 acquires engine state quantities (the cooling water temperature THW, the engine rotation speed NE and the engine torque Tq) based on a signal from the engine state quantity detection sensor 103.

The control device 100 acquires the irradiation amount L based on a signal from the solar radiation amount sensor 104.

The control device 100 acquires the opening degree θ of the grill shutter 105 based on the rotation instruction signal to the actuator 105a.

Every time the sampling period elapses, the camera control ECU 120 acquires the temperature Tc of the camera unit 30 based on the signal from the thermistor 30a, and transmits the value of the temperature Tc to the control device 100.

Every time the sampling period elapses, the camera control ECU 120 estimates the voltage Vp of the IG electric power source (i.e., the heater voltage Vh) according to the above-described method, and transmits the value of the estimated voltage Vp (i.e., the heater voltage Vh) to the control device 100.

Every time the sampling period elapses, the brake control ECU 130 acquires the vehicle speed SPD based on the signal from the vehicle speed sensor 131, and transmits the value of the vehicle speed SPD to the control device 100.

Meanwhile, when the outside air temperature (i.e., air temperature outside of the vehicle) is low, dew condensation may occur on the light transmission portion 85a of the front window 85. Dew condensation is easy to occur when an air heating device is used in the passenger compartment. Furthermore, when the outside air temperature is low, ice and/or frost may adhere to the light transmission portion 85a. If such a phenomenon occurs, the imaging data generated by the image pickup device 32b may be data representing a blurred object image, and/or the image pickup unit 32 may fail to image an object in front of the vehicle. In such a case, the control device 100 may fail to accurately perform the above-described driving support control using imaging data. Thus, the control device 100 prevents such a situation from occurring by executing the processing (routine) shown by the flowchart of FIG. 10. It should be noted that the control device 100 sets the switch element 102 to the OFF state immediately after the ignition key switch is changed from an OFF position to an ON position.

The CPU of the control device 100 (hereinafter simply referred to as "CPU") starts the processing of the routine shown in FIG. 10 from Step 1000 every time a predetermined period of time T (see FIG. 11. It is set to 3 minutes in the present embodiment) elapses, and thereafter proceeds to Step 1001. Then, the CPU calculates a corrected outside air temperature Toc by correcting the outside air temperature Tair detected by the outside air temperature sensor 101 at a predetermined time tp immediately before the start of the processing of this routine based on the detection values of the engine state quantity detection sensor 103 and the solar radiation amount sensor 104 and the rotation amount of the actuator 105a (i.e., the opening degree of the grill shutter 105).

Since the front grill is located just in front of the engine room, exhaust heat generated by the engine reaches the outside air temperature sensor 101. There is a correlation between the exhaust heat amount of the engine and an increase amount of the detection value of the outside air temperature sensor 101 which is caused by this exhaust heat amount. Further, there is a correlation between the exhaust heat amount of the engine and the engine state quantities (for example, the cooling water temperature THW, the engine rotation speed NE and the engine torque Tq). Here, the increase amount of the detection value of the outside air temperature sensor 101 which is cause by the engine state quantities is defined as ΔTe.

The relationship between the increase amount ΔTe and the engine state quantities (the cooling water temperature THW, the engine rotation speed NE and the engine torque Tq) is acquired in advance by an experiment and is stored in the ROM as a first map MapΔTe in a look-up table format. The control device 100 calculates the increase amount ΔTe by applying the detected engine state quantities (the cooling water temperature THW, the engine rotation speed NE and the engine torque Tq) to the first map MapΔTe (see the following expression). Noted that the engine torque Tq is obtained by using the accelerator pedal operation amount PA, the engine rotation speed NE, and a lookup table MapTq (PA, NE).

Increase amount ΔTe=MapΔTe(THW,NE,Tq)

When the natural light reaches the outside air temperature sensor 101, the detection value of the outside air temperature sensor 101 rises. That is, there is a correlation between an amount of natural light irradiated to the outside air temperature sensor 101 and an increase amount of the detection value of the outside air temperature sensor 101. Here, the increase amount of the detection value of the outside air temperature sensor 101 which is caused by an irradiation amount of natural light is defined as ΔTr. Since both the vehicle outside air temperature sensor 101 and the solar radiation amount sensor 104 are provided in the front grill, the irradiation amount L detected by the solar radiation amount sensor 104 can be estimated to be the irradiation amount of natural light received by the outside air temperature sensor 101.

The relationship between the increase amount ΔTr and the irradiation amount L is acquired in advance by an experiment and stored in the ROM as a second map MapΔTr in a lookup table form. The control device 100 calculates the increase amount ΔTr by applying the irradiation amount L detected by the solar radiation amount sensor 104 to the second map MapΔTr (see the following expression).

Increase amount ΔTr=MapΔTr(L)

When the grill shutter 105 is positioned at a fully closed position, air cannot flow to the engine room through the front grill. On the other hand, when the grill shutter 105 is in an open state, air flows to the engine room through the front grill. As described above, the amount of air flowing to the engine room through the front grill changes depending on the opening degree of the grill shutter 105. As the opening degree of the grill shutter 105 becomes smaller, the amount of air flowing to the engine room through the front grill becomes smaller, so that the detection value of the outside air temperature sensor 101 becomes larger. In this way, there is a correlation between the opening degree of the grill shutter 105 and the detection value of the outside air temperature sensor 101. Here, an increase amount of the detection value of the outside air temperature sensor 101 due to decrease of the opening degree of the grill shutter 105 is defined as ΔTg.

The relationship between the increase amount ΔTg and the opening degree θ of the grill shutter 105 is acquired in advance by an experiment and is stored in the ROM as a third map MapΔTg in a lookup table form. The control device 100 calculates the increase amount ΔTg by applying "the opening degree θ of the grill shutter 105 represented by the rotation instruction signal transmitted to the actuator 105*a*" to the third map MapΔTg (see the following expression).

Increase amount ΔTg=MapΔTg(θ)

In Step 1001, the CPU calculates the increase amount ΔTe, the increase amount ΔTr, and the increase amount ΔTg using the lookup tables as described above, and calculates the sum of these increase amounts as a temperature increase amount ΔTu (see the following expression).

Temperature increase amount ΔTu=ΔTe+ΔTr+ΔTg

The CPU may calculate the temperature increase amount ΔTu by applying the above-described parameters to a temperature increase amount map MapΔTu which is a look-up table integrated into one as shown in the following expression.

Temperature increase amount ΔTu=MapΔTu(THW, NE,Tq,L,θ)

Further, in Step 1001, the CPU calculates a value obtained by subtracting the temperature increase amount ΔTu from the outside air temperature Tair detected by the outside air temperature sensor 101 as the corrected outside air temperature Toc (see the following expression). Since the corrected outside air temperature Toc is not affected by the temperature increase amount ΔTu, the corrected outside air temperature Toc is a value close to the outside air temperature in the vicinity of the light speed transmission part 85*a*.

Corrected outside air temperature Toc=outside air temperature Tair−temperature increase amount ΔTu Next, the CPU proceeds to Step 1002 to determine whether or not the corrected outside air temperature Toc is lower than a predetermined outside air temperature threshold Tath. When the corrected outside air temperature Toc is equal to or higher than the predetermined outside air temperature threshold Tath, "a possibility that dew condensation occurs on the light transmission portion 85*a*" and "a possibility that ice and/or frost adhere to the light transmission portion 85*a*" are extremely low. Therefore, in this case, the CPU determines "No" in Step 1002, and proceeds to Step 1009 to set the switch element 102 to the OFF state (i.e., to stop supplying electricity to the heater 43*b*). Thereafter, the CPU directly proceeds to Step 1095 and temporarily ends this routine. As a result, the state of the switch element 102 is maintained in the OFF state, so that the heater 43*b* does not generate heat.

On the other hand, when the corrected outside air temperature Toc is lower than the predetermined outside air temperature threshold Tath, the CPU determines "Yes" in Step 1002, and proceeds to Step 1003 to determine whether or not the vehicle speed SPD detected by the vehicle speed sensor 131 at the predetermined time tp immediately before the start of the processing of this routine is equal to or higher than a predetermined speed threshold SPDth. The control device 100 executes the driving support control based on the imaging data generated by the camera unit 30 when the vehicle speed SPD is equal to or higher than the speed threshold SPDth. Therefore, when the vehicle speed SPD is less than the speed threshold SPDth, the imaging data is not used, so it is not necessary to energize the heater 43*b*. Therefore, when the vehicle speed SPD is less than the speed threshold SPDth, the CPU determines "No" in Step 1003, and directly proceeds to Step 1095 via Step 1009. As a result, the switch element 102 is maintained in the OFF state, so that the heater 43*b* does not generate heat.

On the other hand, when the vehicle speed SPD is equal to or higher than the speed threshold SPDth, the CPU determines "Yes" in Step 1003 and proceeds to Step 1004. Noted that, Step 1003 can be omitted. In other words, the speed threshold SPDth can be "0 km/h". In this case, the CPU inevitably proceeds to Step 1004 regardless of the vehicle speed SPD. In Step 1004, the CPU determines whether or not the temperature Tc of the camera unit 30 detected by the thermistor 30a at the predetermined time tp immediately before the start of the processing of this routine is within a predetermined normal temperature range (i.e., a temperature range in which the operation of the camera unit 30 is guaranteed). When the temperature Tc of the camera unit 30 is not within the normal temperature range, the CPU determines "No" in Step 1004, and proceeds directly to Step 1095 via Step 1009. As a result, since the switch element 102 is maintained in the OFF state, the heater 43b does not generate heat.

On the other hand, when the temperature Tc of the camera unit 30 is within the normal temperature range, the CPU determines "Yes" in Step 1004, and proceeds to Step 1007 after executing the processing of Steps 1005 and 1006 described below in that order. When the CPU determines "Yes" in all of Steps 1002 to 1004, a predetermined control start condition is satisfied.

Step 1005. First, the CPU determines whether the vehicle speed SPD detected at the predetermined time tp is included in a predetermined low speed area or in a predetermined high speed area. For example, the range of the low speed area can be set to 0 km/h or more and less than 50 km/h, and the range of the high speed area can be set to 50 km/h or more.

When the vehicle speed SPD is a vehicle speed included in the low speed area, the CPU selects the low speed duty ratio calculation map (MapLo) as a duty ratio calculation map (lookup table). Then, as shown in the following formula, the CPU calculates the duty ratio by applying "the heater voltage Vh, the corrected outside air temperature Toc and the vehicle speed SPD" at the predetermined time tp to this map as arguments.

Duty ratio=MaPLo($Vh, Toc, SPD$)

Figure 11:
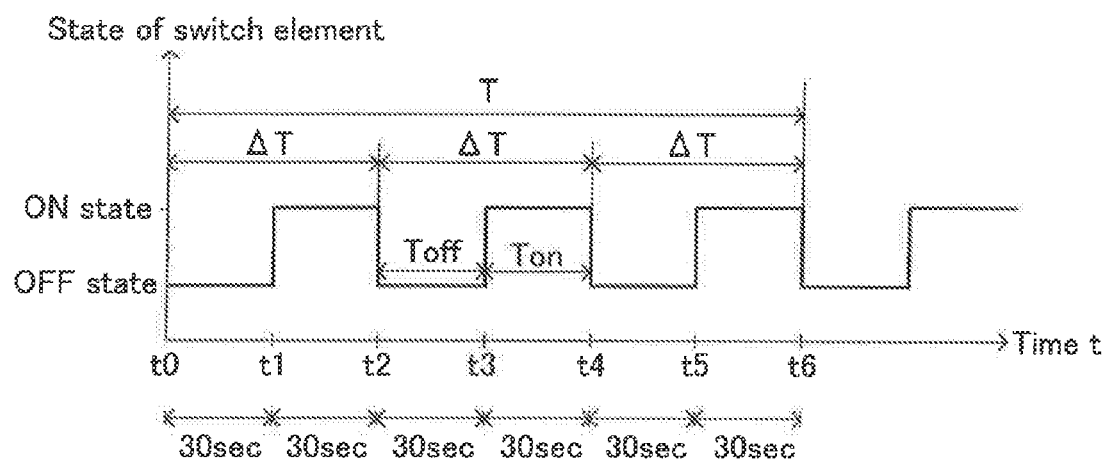
FIG. 11 is a graph showing a duty ratio when electricity is supplied to a heater.

As shown in FIG. 11, the duty ratio is a ratio (%) expressed by the following formula. Here, the period of time (voltage application time) during which the switch element 102 is in the ON state is defined as Ton, and the period of time (voltage application stop time) during which the switch element 102 is in the OFF state is defined as Toff. In this embodiment, assuming Ton+Toff=one cycle $\Delta T$, the predetermined period of time T is set to be three times as long as $\Delta T$ (i.e., $T=3 \cdot \Delta T$). The larger the duty ratio becomes, the larger electric energy supplied to the heater 43b (i.e., electric energy consumed by the heater 43b) for the predetermined period of time T (i.e., total electric energy) becomes, and thus the heat generation amount of the heater 43b for the predetermined period of time T (i.e., total heat generation amount [J]) becomes larger.

Duty ratio=[$T$on/($T$on+$T$off)]·100(%)

On the other hand, when the vehicle speed SPD is a vehicle speed included in the high speed area, the CPU selects the high speed duty ratio calculation map (MapHi) as the duty ratio calculation map. Then, as shown in the following formula, the CPU calculates the duty ratio by applying "the heater voltage Vh, the corrected outside air temperature Toc and the vehicle speed SPD" at the predetermined time tp to this map as arguments.

Duty ratio=MaPHi($Vh, Toc, SPD$)

According to an experiment, it was found that when the temperature of the heater 43b is maintained within a predetermined temperature range (hereinafter referred to as "an appropriate temperature range"), "the occurrence of dew condensation on the light transmission portion 85a and the adherence of ice and frost etc to the light transmission portion 85a" can be avoided. Noted that when the temperature of the heater 43b is maintained within the appropriate temperature range, the temperature of the light transmission portion 85a can be maintained at "temperature within the predetermined range which is equal to or higher than the dew point temperature". It is assumed that this is the reason why the occurrence of dew condensation and the adherence of ice and frost can be avoided.

Hereinafter, the heat generation amount to be generated by the heater 43b for the predetermined period of time T to maintain the temperature of the heater 43b within the appropriate temperature range may be referred to as a target heat generation amount Et.

On the other hand, the temperature of the heater 43b has a strong correlation with the heat generation amount generated by the heater 43b and the amount of heat escaping from the heater 43b for a predetermined period of time (i.e., the predetermined period of time T of this embodiment). Furthermore, the amount of heat escaping from the heater 43b has a strong correlation with a heat radiation amount of the light transmission portion 85a. The heat radiation amount of the light transmission portion 85a for a predetermined period of time has a strong correlation with "the corrected outside air temperature Toc and the vehicle speed SPD". Therefore, "the corrected outside air temperature Toc and the vehicle speed SPD" at the predetermined time tp are used as arguments of the low speed duty ratio calculation map (MapLo) and the high speed duty ratio calculation map (MapHi). Further, since the heater voltage Vh at the predetermined time tp has a strong correlation with the heat generation amount of the heater 43b, the heater voltage Vh at the predetermined time tp is used as an argument of the low speed duty ratio calculation map (MapLo) and the high speed duty ratio calculation map (MapHi).

The low speed duty ratio calculation map (MapLo) and the high speed duty ratio calculation map (MapHi) may be integrated into one duty ratio calculation map (MapCo (Vh, Toc, SPD)). Hereinafter, when there is no need to distinguish the low speed duty ratio calculation map (MapLo) and the high speed duty ratio calculation map (MapHi), these maps are called a duty ratio calculation map. A duty ratio calculated in accordance with the duty ratio calculation map is a value corresponding to a target value of "the heat generation amount (supplied electric energy) of the heater 43b for the predetermined period of time T" which is necessary for maintaining the temperature of the heater 43b within the appropriate temperature range. Therefore, the duty ratio calculation map is obtained (made) based on a relationship between the three factors (i.e., the heater voltage Vh, the corrected outside air temperature Toc, the vehicle speed SPD) and the duty ratio necessary for maintaining the temperature of the heater 43b within the appropriate temperature range (a target value of the total heat generation amount to be generated by the heater 43b for the predetermined period of time T), and is stored in the ROM. This relationship is obtained in advance by an experiment.

Noted that, the target heat generation amount (the target value of the heat generation amount) can be calculated based on the corrected outside air temperature Toc and the vehicle speed SPD, and the duty ratio can be calculated based on the target heat generation amount and the heater voltage Vh.

The duty ratio becomes smaller as the heater voltage Vh becomes higher, regardless of whether the low speed duty ratio calculation map (MapLo) or the high speed duty ratio calculation map (MapHi) is used.

The duty ratio becomes smaller as the corrected outside air temperature Toc becomes higher, regardless of whether the low speed duty ratio calculation map (MapLo) or the high speed duty ratio calculation map (MapHi) is used.

When the heater voltage Vh and the corrected outside air temperature Toc are predetermined constant values respectively, the duty ratio obtained by the high speed duty ratio calculation map (MapHi) is larger than the duty ratio obtained by the low speed duty ratio calculation map (MapLo). Furthermore, the duty ratio becomes larger as the vehicle speed SPD becomes higher, regardless of whether the low speed duty ratio calculation map (MapLo) or the high speed duty ratio calculation map (MapHi) is used.

Step 1006: The CPU does the processing to execute the energization control (heat generation amount control) of the heater 43b over the predetermined period of time T according to the duty ratio. That is, as shown in FIG. 11, the CPU sends an instruction signal to a driving circuit (not shown) of the switch element 102 so that a switching operation is repeated three times (see the times t0 to t6 in FIG. 11). In each of the switching operations, the CPU sets the switch element 102 to the OFF state over the voltage application stop time Toff defined by the duty ratio, and then sets the switch element 102 to the ON state over the voltage application time Ton defined by the duty ratio. Thereafter, the CPU proceeds to Step 1007 (described later).

When the CPU determines No in Step 1007, the CPU proceeds to Step 1008 to determine whether or not the predetermined period of time T has elapsed since the start of this routine (see the time t6 in FIG. 11). When the predetermined period of time T has elapsed since the start of this routine, the CPU determines "Yes" in Step 1008 to proceed to Step 1095. In this case, the CPU immediately restarts this routine from Step 1000.

As described above, when the voltage Vp of the IG electric power source (the voltage Vh of the heater 43b) at the predetermined time tp is high, the application time of the voltage applied to the heater 43b during which the heater 43b generates the target heat generation amount Et becomes short. When the voltage Vp of the IG electric power source (the voltage Vh of the heater 43b) at the predetermined time tp is low, the application time of the voltage applied to the heater 43b during which the heater 43b generates the target heat generation amount Et becomes long. Therefore, regardless of the magnitude of the voltage Vp (the voltage Vh) at the predetermined time tp, the heat generation amount generated by the heater 43b during the time period from the time t0 to the time t6 becomes a constant value which is substantially the same as the target heat generation amount Et.

As a result, the photographing apparatus for vehicle according to the present embodiment can maintain the temperature of the heater 43b within the appropriate temperature range. As a result, the photographing apparatus for vehicle can reduce the possibility of "the occurrence of dew condensation on the light transmission portion 85a and the adherence of ice and frost etc to the light transmission portion 85a", and can reduce the possibility that the temperature of the heater 43b becomes excessively high temperature which considerably exceeds the appropriate temperature range. Therefore, it is possible to reduce the possibility of thermal deformation of a component (for example, the PET sheet 43a) located in the vicinity of the heater 43b.

When the control device 100 brings the internal combustion engine under the SS control so that the operation of the internal combustion engine is stopped or the operation of the internal combustion engine is restarted at the predetermined time tp, the camera control ECU 120 regards the voltage Vc at the predetermined time tp and the voltage Vp (the heater voltage Vh) at the predetermined time tp as equal to each other. As described above, the actual voltage applied to the heater 43b at this time is likely to be lower than the voltage Vc. Therefore, in this case, the duty ratio is calculated based on the voltage Vc which is larger than the voltage actually applied to the heater 43b. Therefore, when electricity is supplied from the capacitor 112 to the heater 43b for the predetermined period of time T based on this duty ratio, the total heat generation amount of the heater 43b is likely to be lower than "the total heat generation amount to be generated by the heater 43b for the predetermined period of time T which is determined at the start of this routine". In other words, in this case, a risk that the total heat generation amount of the heater 43b becomes greatly larger than "the total heat generation amount to be generated by the heater 43b for the predetermined period of time T" is very small. Therefore, the temperature of the heater 43b does not become excessively high.

By the way, in Step 1007, the CPU determines whether or not the absolute value of a difference $\Delta$Vp between "the voltage Vp (the heater voltage Vh) estimated by the camera control ECU 120 at the current time" and "the voltage Vp (the heater voltage Vh) estimated by the camera control ECU 120 at the predetermined time tp (i.e., at the time just before start of the execution of this routine)" is equal to or more than a first predetermined value.

Further, based on the outside air temperature Tair detected by the outside air temperature sensor 101 at the current time, the CPU executes calculation which is the same as Step 1001 to calculate the corrected outside air temperature Toc at the current time. Then, the CPU determines whether or not the absolute value of a difference $\Delta$Toc between the corrected outside air temperature Toc calculated at the predetermined time tp and the corrected outside air temperature Toc calculated at the current time is equal to or more than a second predetermined value.

Further, the CPU determines whether or not the absolute value of a difference $\Delta$SPD between the vehicle speed detected by the vehicle speed sensor 131 at the current time and the vehicle speed detected at the predetermined time tp is equal to or more than a third predetermined value.

When at least one of the absolute value of the difference $\Delta$Vp, the absolute value of the difference $\Delta$Toc and the absolute value of the difference $\Delta$SPD is equal to or more than the corresponding predetermined value, at least one of the arguments for determining the duty ratio greatly changes from the corresponding value at the predetermined time tp. That is, when at least one of three inequality expressions (i.e., $|\Delta$Vp$|\geq$the first predetermined value, $|\Delta$Toc$|\geq$the second predetermined value, and $|\Delta$SPD$|\geq$the third predetermined value) is satisfied, at least one of the arguments for determining the duty ratio greatly changes from the corresponding value at the predetermined time tp. Therefore, in this case, it is not preferable to continue the energization control based on the duty ratio determined at the predetermined time tp.

Therefore, in this case, the CPU determines "Yes" in Step 1007, and proceeds to Step 1009 to set the switch element 102 to the OFF state (i.e., to stop the energization of the heater 43b). Thereafter, the CPU proceeds directly to Step 1095, and temporarily ends this routine. In this case, since the heater 43b is not energized from the time when processing of Step 1009 is executed after the CPU determines Yes in Step 1007 until the time when this routine is started again (i.e., until the time when the predetermined period of time T elapses from the start time of this routine), a risk that the total heat generation amount of the heater 43b from the time of starting this routine becomes excessive large is small.

On the other hand, when neither the absolute value of the difference ΔVp, the absolute value of the difference ΔToc nor the absolute value of the difference ΔSPD is equal to or more than the corresponding predetermined value, the CPU determines No in Step 1007 and proceeds to Step 1008. The above is the contents of the heater control by the CPU.

In the case where the electrical circuit does not include the fuse 44b, when a short circuit (ground fault) occurs in the electrical circuit in the "short circuit" manner of FIG. 9, electricity of the IG electric power source is supplied to the heater 43b even when the control device 100 sets the switch element 102 to the OFF state. That is, in this case, the electricity of the IG electric power source is continuously supplied to the heater 43b for a long time. Therefore, the heater 43b, the heated portion 41a, and the peripheral portion thereof become excessively hot.

However, the photographing apparatus 10 of the present embodiment is provided with the fuse 44b provided on the electrical circuit. The soluble metal of the fuse 44b is heated by the heat transmitted from the heater 43b via the lead wires 44c, 44d and the heat transmitted from the heated portion 41a.

When a short circuit occurs in the electrical circuit in the "short circuit" manner in FIG. 9, the heater 43b and the heated portion 41a become high temperature. Then, the temperature of the fuse 44b becomes a temperature equal to or more than a predetermined value, and thus the fuse 44b is blown (melted). Then, since the electricity of the IG electric power source fails to be supplied to the heater 43b, the heater 43b, the heated portion 41a, and the peripheral portion thereof are prevented from becoming excessively hot.

Modified Embodiment

Figure 10:
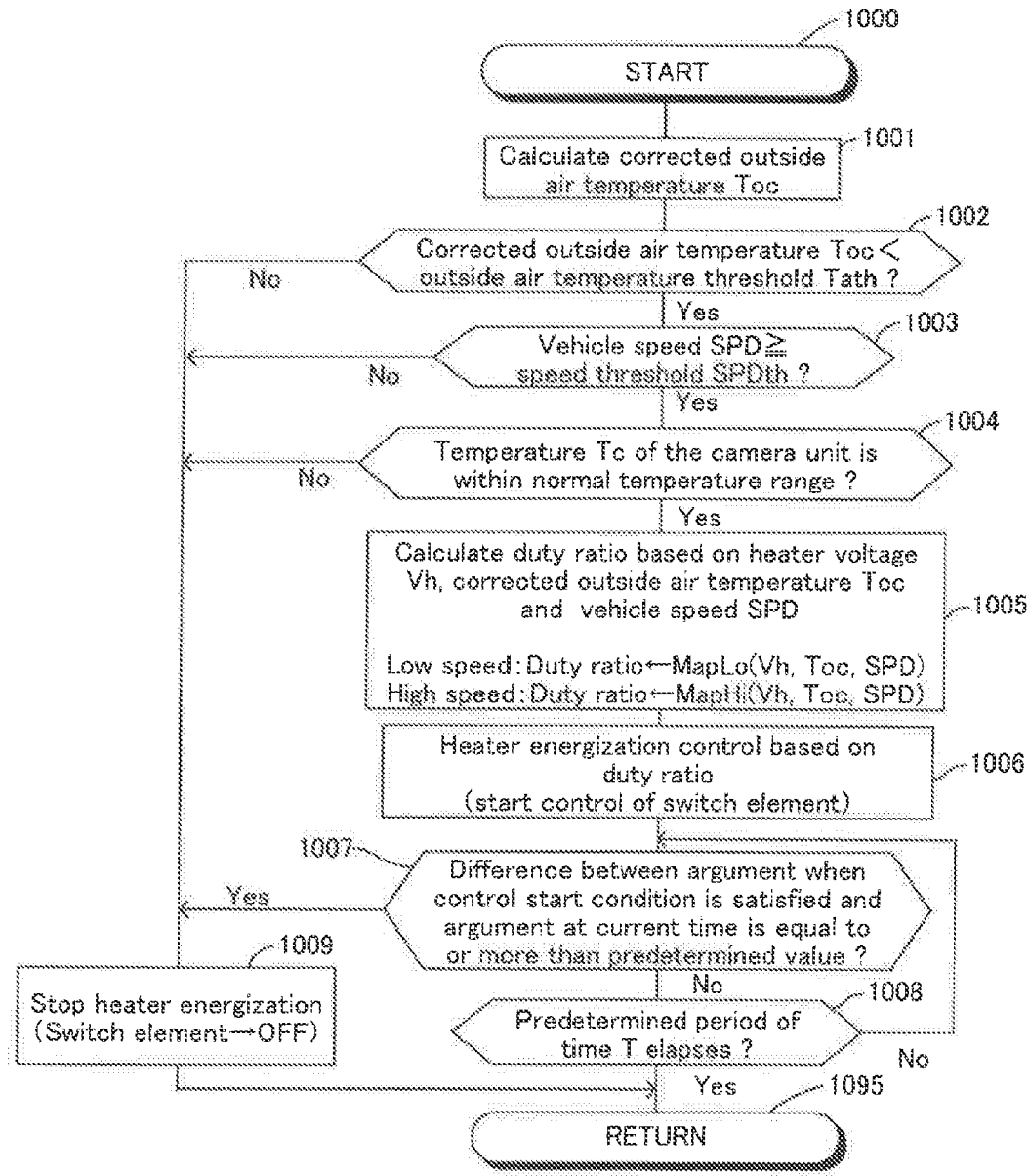
FIG. 10 is a routine showing processing executed by a control device.
Figure 12:
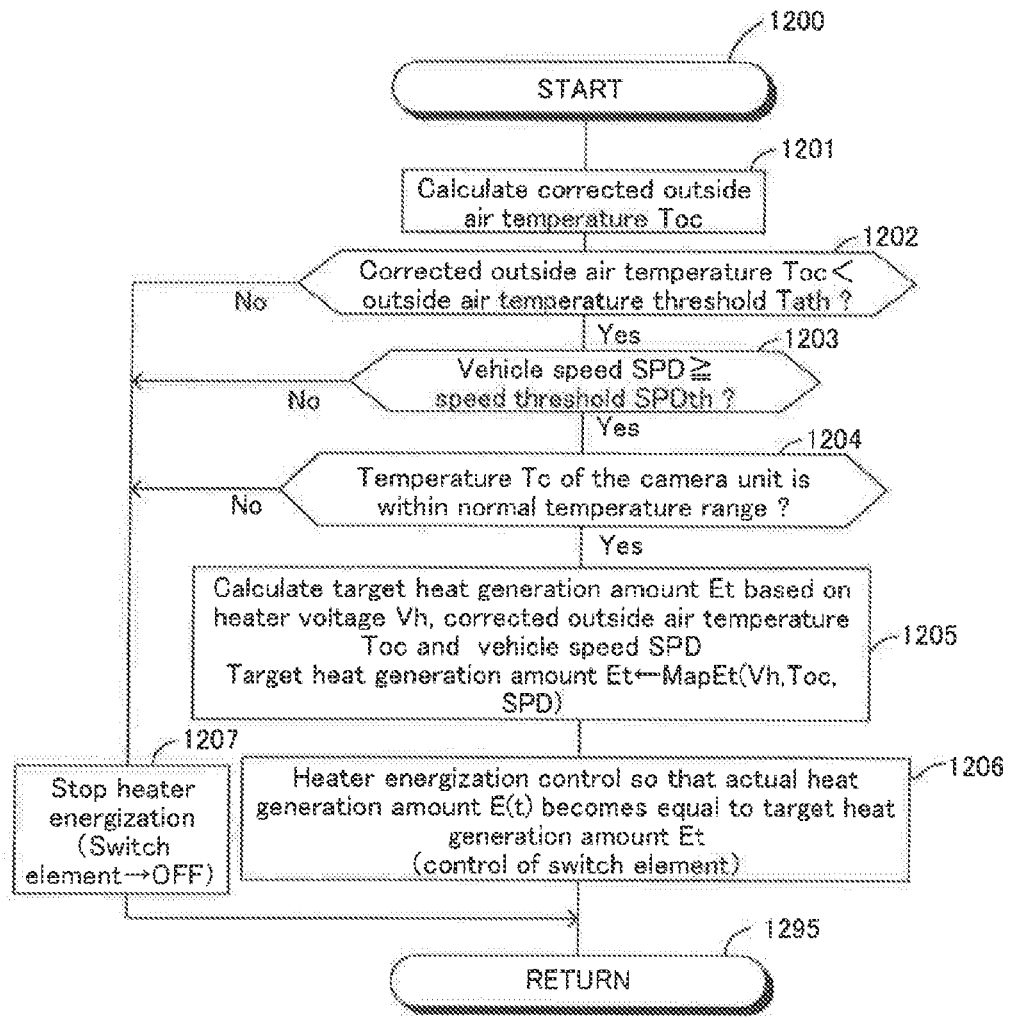
FIG. 12 is a routine showing processing executed by the control device according to a modified embodiment of the present invention.

For example, the CPU of the control device 100 according to the modified embodiment of the present invention may execute the routine shown by the flowchart of FIG. 12 every time the predetermined period of time T elapses instead of the flowchart of FIG. 10. Steps 1201, 1202, 1203 and 1204 of this flowchart are the same as Steps 1001, 1002, 1003 and 1004, respectively. When determining "No" in any one of Steps 1202, 1203 and 1204, the CPU proceeds to Step 1207 to set the switch element 102 to the OFF state (i.e., to stop supplying electricity to the heater 43b).

When the CPU determines "Yes" in Step 1204, the CPU executes the processing in Steps 1205 and 1206 described below.

Step 1205: As shown in the following formula, the CPU applies "the corrected outside air temperature Toc and the vehicle speed SPD" at the predetermined time tp to a target heat generation amount calculation map (look-up table) MaPEt stored in the ROM of the control device 100 as arguments to calculate a target heat generation amount Et. The target heat generation amount Et is a target value of "the heat generation amount of the heater 43b (i.e., supplied electric energy) for the predetermined period of time T" which is necessary for maintaining the temperature of the heater 43b within the appropriate temperature range.

Target heat generation amount $Et = MaPEt(Toc, SPD)$

Step 1206: The CPU executes energization control (heat generation amount control) of the heater 43b according to the target heat generation amount Et. More specifically, the CPU changes the switch element 102 from the OFF state to the ON state, thereby supplying electricity of the IG electric power source to the heater 43b to cause the heater 43b to generate heat. Further, the CPU calculates an actual heat generation amount (total heat amount, integrated value of heat amount) E(t) generated actually by the heater 43b from the time at which the switch element 102 is changed to the ON state based on the following formula (1). Noted that, "t" is time, "R" is the resistance value of the heater 43b, and "V" is the voltage of the heater 43b. The above-mentioned heater voltage Vh is used as "V".

$$E(t) = \frac{1}{R} \int_0^t V^2(t) dt \qquad \text{[Formula (1)]}$$

Further, in Step 1206, the CPU monitors whether or not the actual heat generation amount E(t) calculated based on the formula (1) reaches (i.e., becomes equal to or higher than) the target heat generation amount Et, and changes the switch element 102 from the ON state to the OFF state when the actual heat generation amount E(t) reaches the target heat generation amount Et. Thereafter, when the predetermined period of time T elapses from the time at which the processing of Step 1201 is started, the CPU restarts this routine from Step 1200.

Further, in Step 1206, the CPU determines whether or not the absolute value of the difference ΔToc between the corrected outside air temperature Toc calculated at the predetermined time tp (the time point immediately before the start of the routine in FIG. 12) and the corrected outside air temperature Toc calculated at the current time is equal to or more than the second predetermined value. In addition, the CPU determines whether or not the absolute value of the difference ΔSPD between the vehicle speed detected by the vehicle speed sensor 131 at the current time and the vehicle speed detected at the predetermined time tp is equal to or more than the third predetermined value.

Then, the CPU changes the switch element 102 from the ON state to the OFF state at earlier timing out of the time when the absolute value of the difference ΔToc becomes equal to or more than the second predetermined value and the time when the absolute value of the difference ΔSPD becomes equal to or more than the third predetermined value even when the actual heat generation amount E(t) has not reached the target heat generation amount Et. Thereafter, when the predetermined period of time T elapses from the time when the processing of Step 1201 is started, the CPU restarts this routine from Step 1200.

This makes it possible to reduce the possibility that the total heat generation amount generated by the heater 43b from the time of starting this routine becomes excessive.

Although the present invention has been described based on the embodiment and modified embodiment, the present invention is not limited to the above-described embodiment and modified embodiment, and various modifications can be made without departing from the object of the present invention.

Furthermore, in the above-described embodiment and the modified embodiment, instead of using the look-up tables, the duty ratio and the target heat generation amount Et may be calculated by using formulas having the arguments of the look-up tables as variables.

The heater voltage Vh used in Step 1005 of FIG. 10 may be the voltage at the time immediately after the switch element 102 is switched from the OFF state to the ON state. In other words, the CPU may switch the switch element 102 from the OFF state to the ON state at time t0 in FIG. 11 and determine the duty ratio immediately thereafter.

Furthermore, in a modified embodiment of the present invention, the control device 100 may be configured so that the potential (voltage) of the electrical supply line EL1 can be detected as the heater voltage Vh.

The irradiation amount of natural light may be detected by a light amount detection sensor provided in the camera unit 25. In this case, since the irradiation amount of natural light applied to the front grill is not an outside air temperature influence factor, the solar radiation amount sensor 104 may be omitted.

When the CPU determines Yes in Step 1007, the total time for applying voltage to the heater 43b (i.e., total value of the voltage application time Ton in the predetermined period of time T) may be shortened. For example, it is assumed that the total voltage application time calculated in Step 1005 is 90 seconds. In this case, when the CPU determines Yes in Step 1007, the CPU calculates a new duty ratio based on "the heater voltage Vh, the corrected outside air temperature Toc and the vehicle speed SPD" at that time in the same way as Step 1005. Then, for example, when the new total voltage application time (i.e., the total value of the voltage application time Ton in the predetermined period of time T) is 70 seconds and the voltage has already been applied to the heater 43b for a total of 50 seconds at the current time, the CPU ends the power supply to the heater 43b when time period for applying the voltage to the heater 43b reaches 20 seconds.

The temperature increase amount $\Delta$Tu may be calculated in consideration of an outside air temperature influence factor that affects the detection value of the outside air temperature sensor 101 and is different from the engine state quantities, the irradiation amount and the angle of the grill shutter 105.

In the case where there are a plurality of the outside air temperature influence factors, the temperature increase amount $\Delta$Tu may be obtained based only on only some of the outside air temperature influence factors. For example, when the engine state quantities, the irradiation amount, and the angle of the grill shutter 105 are the outside air temperature influence factors, the temperature increase amount $\Delta$Tu may be obtained from both of the engine state quantities and the irradiation amount or one of the engine state quantities and the irradiation amount (i.e., the temperature increase amount $\Delta$Tu=$\Delta$Te, the temperature increase amount $\Delta$Tu=$\Delta$Tr, or the temperature increase amount $\Delta$Tu=$\Delta$Te+$\Delta$Tr).

When the corrected outside temperature Toc based on the outside air temperature influence factor is used as an argument of the low speed duty ratio calculation map and the high speed duty ratio calculation map, the voltage Vc detected by the camera control ECU 120 may be used as the heater voltage Vh which is applied to the low speed duty ratio calculation map and the high speed duty ratio calculation map as an argument. That is, the voltage Vc, which is different from a value obtained by adding the maximum value Vrmax to the voltage Vc, may be applied to these maps.

When the voltage Vp (=the voltage Vc+the voltage drop amount Vr) calculated considering the maximum value Vrmax is used as an argument of the low speed duty ratio calculation map and the high speed duty ratio calculation map, the outside air temperature Tair detected by the outside air temperature sensor 101 may be applied to the low speed duty ratio calculation map and the high speed duty ratio calculation map.

The photographing apparatus for the vehicle may be mounted to a window different from a front window. For example, a photographing apparatus for vehicle may be mounted to a back window of a vehicle so that an obstacle located behind the vehicle can be detected by this photographing apparatus for vehicle.

Instead of the relay element 110 or together with the relay element 110, an electronic component (for example, an ECU) different from the relay element 110 may be provided on the electrical supply line EL2.

What is claimed is:
1. A photographing apparatus for a vehicle comprising:
a camera disposed inside the vehicle so as to face a window of the vehicle and is configured to receive photographing light passing through the window;
a heater disposed inside the vehicle so as to face the window, the heater generating heat that is transferred to the window when a voltage of an electric power source of the vehicle is applied to the heater; and
a control device configured to:
repeatedly perform a heat generation amount control, every time a predetermined constant time (T) elapses,
determine a voltage application time that is a time for applying the voltage of the electric power source to the heater in the predetermined constant time (T) and a voltage application stop time that is a time for applying no voltage to the heater in the predetermined constant time (T), and
apply the voltage to the heater for the time corresponding to the voltage application time and apply no voltage to the heater for the time corresponding to the voltage application stop time,
wherein,
the voltage application time and the voltage application stop time are based on a magnitude of a heat generation amount determination factor affecting a temperature of the window at a start time point of the predetermined constant time (T);
the control device is configured to execute either a first process or a second process when a specific condition is satisfied between the start time point to an end time point of the predetermined constant time (T);
the specific condition is satisfied when the magnitude of the heat generation amount determination factor deviates from the magnitude of the heat generation amount determination factor at the start time point by a predetermined value or more;
the first process is a process to stop applying the voltage to the heater until the end time point, and to restart the heat generation amount control at the end time point; and
the second process is a process to change the voltage application time and the voltage application stop time based on the magnitude of the heat generation amount determination factor at the time when the specific condition is satisfied and to restart the heat generation amount control at the end time point.

2. The photographing apparatus of claim 1, further comprising:
- an outside air temperature detector detecting an outside air temperature; and
- an outside air temperature corrector calculating a corrected outside air temperature by correcting the outside air temperature obtained based on a detection value of the outside air temperature detector according to a temperature increase amount that is estimated based on magnitude of an outside air temperature influence factor affecting the detection value of the outside air temperature detector,
- wherein the control device is configured to use the corrected outside air temperature as the heat generation amount determination factor.

3. The photographing apparatus of claim 2, wherein,
- the outside air temperature detector is provided in a front grill of the vehicle,
- the outside air temperature influence factor is at least one of an operation state quantity of an internal combustion engine of the vehicle, an irradiation amount of natural light given to the vehicle and an opening degree of a grill shutter provided in the vehicle.

4. A heating device disposed inside a vehicle so as to face a window of the vehicle together with a photographing apparatus, the heating device comprising:
- a heater that generates heat when a voltage of an electric power source of the vehicle is applied to the heater; and
- a control device configured to repeatedly perform a heat generation amount control, every time a predetermined constant time (T) elapses, a time for applying the voltage of the electric power source to the heater is based on a magnitude of a heat generation amount determination factor affecting a temperature of the window at a start time point of the predetermined constant time (T), wherein,
- the control device is configured to execute either a first process or a second process when a specific condition is satisfied between the start time point to an end time point of the predetermined constant time (T);
- the specific condition is satisfied when the magnitude of the heat generation amount determination factor deviates from the magnitude of the heat generation amount determination factor at the start time point time by a predetermined value or more;
- the first process is a process to stop applying the voltage to the heater until the end time point, and to restart the heat generation amount control at the end time point; and
- the second process is a process to change the voltage application time and the voltage application stop time based on the magnitude of the heat generation amount determination factor at the time when the specific condition is satisfied and to restart the heat generation amount control at the end time point.

5. The photographing apparatus of claim 1, wherein the control device is configured to keep the windshield at a temperature which is equal to or higher than a dew point temperature of outside air.

6. The heating device of claim 4, wherein the control device is configured to keep the windshield at a temperature which is equal to or higher than a dew point temperature of outside air.

* * * * *